L. BEMELMANS.
Salt-Drying Apparatus.

No. 212,648. Patented Feb. 25, 1879.

WITNESSES:
W. W. Hollingsworth
Edw. W. Byrn

INVENTOR:
L. Bemelmans
BY
ATTORNEYS.

UNITED STATES PATENT OFFICE.

LEON BEMELMANS, OF KANAWHA COURT-HOUSE, WEST VIRGINIA.

IMPROVEMENT IN SALT-DRYING APPARATUS.

Specification forming part of Letters Patent No. 212,648, dated February 25, 1879; application filed November 30, 1878.

*To all whom it may concern:*

Be it known that I, LEON BEMELMANS, of Kanawha Court-House, in the county of Kanawha and State of West Virgina, have invented a new and Improved Apparatus for Drying Salt; and I do hereby declare that the following is a full, clear and exact description of the same, reference being had to the accompanying drawings, forming part of this specification, in which—

Figure 1:
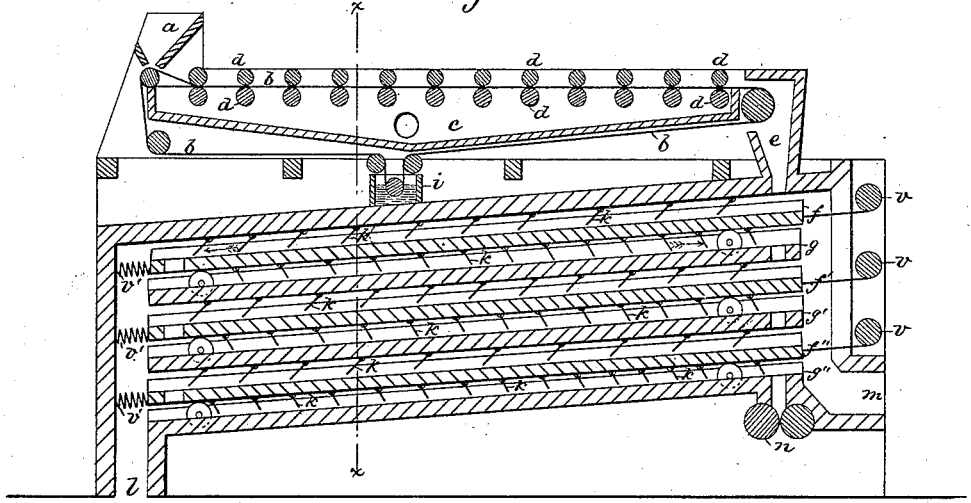
Figure 2:
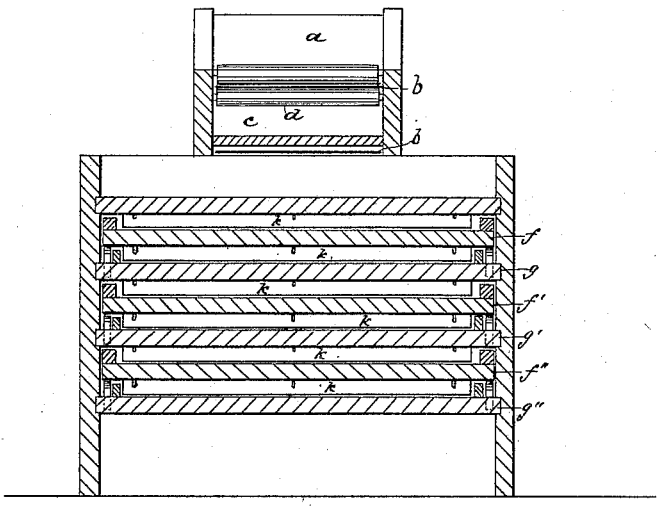

Figure 1 is a longitudinal section. Fig. 2 is a cross-section of the apparatus.

The object of my invention is, first, to extract the water from the substance to such a degree that the said substance shall no more stick to the tools used to stir it; second, to finish the drying process by evaporation with hot air, while the substance is kept in motion, with a view to avoiding as much as practicable the agglomeration of particles; third, to crush any such agglomeration that may have been formed in the preceding process.

$a$ is the hopper, in which the substance to be dried is deposited. Under the hopper circulates an endless apron, $b\ b$, carrying with itself an even thickness of the wet substances. The cloth, with its load, passes over a vacuum-box, $c$, somewhat similar to that used in the Fourdrinier paper-machines for extracting the water from paper-pulp. On its travel over the vacuum-box the cloth and its load pass between the light rollers $d\ d\ d$. It discharges its load in hopper $e$, after which the cloth may be washed in a trough, $i$, filled with water. From hopper $e$ the substance falls successively on the floors $f\ g\ f'\ g'\ f''\ g''$, which may be either inclined or horizontal. Of these floors, the first one, $f$, and every alternate one, $f'\ f''$, is on rollers, and is movable alternately to and fro by means of drums $v$ and springs $v'$, or by any other suitable means.

The other floors, $g\ g$, are stationary. From the ceiling of the box inclosing these floors, and from each floor, hang by hinges the rakes $k\ k\ k$, whose distance apart is less than the range of movement of the floors $f\ f'$. These rakes are in the nature of transverse slats, hinged at their upper edges, and provided with a stop, limiting their motion of revolution; or they may be in the shape of plows, or in any other shape that will best lightly stir and at the same time propel the drying substance. As the floors $f\ f'\ f''$ move to and fro on their rollers, the rakes push the material in the direction of the arrows, while on the return trip of the floors $f\ f'\ f''$ the rakes pass over the drying substance without propelling it.

A current of hot air passes continually through the whole apparatus from $l$ to $m$, either direct, so that the same air will pass only over a single floor, or after being forced by suitable obstacles to circulate on several floors before escaping at $m$.

When dry, the material is pushed between the rollers $n$, which break any agglomeration that may have been produced in the drying process.

All the floors are so constructed that they may be individually drawn out of the box for purpose of repairs.

The suction in the vacuum-box and at $m$ in the drier proper may be produced by a steam-jet or by any other known means.

The apparatus may be used either for drying salt or any other similar substances.

Having thus described my invention, what I claim as new is—

1. In an apparatus for drying salt or other similar substance, a series of floors provided with pendent stirring and conveying blades or rakes, hinged at their tops and reaching to the floor beneath, one set of which floors is normally stationary, and the alternate set movable, substantially as and for the purpose described.

2. The endless apron $b$, provided with rollers $d$, and arranged above to form the top or cover of the vacuum-chamber $c$, as shown, in combination with a hot-air drying apparatus, substantially as described.

3. The drying-chamber having floors provided with hinged conveyers, with the alternate floors made movable, in combination with an endless apron, $b$, having suction-box $c$, the said apron being located above said drying-floors and arranged to discharge its load upon the same, substantially as described.

LEON BEMELMANS.

Witnesses:
 JAMES E. MIDDLETON,
 RICHARD HARTE.